United States Patent
Haselden et al.

(10) Patent No.: US 7,747,637 B2
(45) Date of Patent: Jun. 29, 2010

(54) FOR EACH ITEM ENUMERATOR FOR CUSTOM COLLECTIONS OF ITEMS

(75) Inventors: J. Kirk Haselden, Sammamish, WA (US); Ovidiu Burlacu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 11/370,744

(22) Filed: Mar. 8, 2006

(65) Prior Publication Data

US 2007/0214029 A1 Sep. 13, 2007

(51) Int. Cl.
G06F 7/00 (2006.01)
G06F 17/30 (2006.01)

(52) U.S. Cl. ..................... 707/758; 717/100
(58) Field of Classification Search ........... None
See application file for complete search history.

(56) References Cited

U.S. PATENT DOCUMENTS

| | | | |
|---|---|---|---|
| 6,560,615 B1 | 5/2003 | Zayas et al. | |
| 6,578,068 B1 * | 6/2003 | Bowman-Amuah | 709/203 |
| 6,601,071 B1 | 7/2003 | Bowker et al. | |
| 6,856,995 B1 | 2/2005 | Ibitayo et al. | |
| 7,685,582 B2 * | 3/2010 | Haselden | 717/150 |
| 2003/0076322 A1 | 4/2003 | Ouzts et al. | |
| 2003/0220707 A1 | 11/2003 | Budinger et al. | |
| 2004/0181455 A1 | 9/2004 | Zhou | |
| 2004/0205611 A1 | 10/2004 | Minninger et al. | |
| 2005/0027755 A1 | 2/2005 | Shah et al. | |
| 2005/0203933 A1 | 9/2005 | Chaudhuri et al. | |
| 2005/0262134 A1 | 11/2005 | Sedky et al. | |

FOREIGN PATENT DOCUMENTS

WO WO2005026987 3/2005
WO WO2005110010 11/2005

OTHER PUBLICATIONS

Gosling et. al, The Java Language Specification, (c) 1996, Adison-Wesley, First Edition.*
http://java.sun.com/j2se/1.3/docs/api/index.html, Java 2 Platform, Standard Edition, v. 1.3.1 API Specification, Sun Microsystems, Classes Collections, Enumeration, HashMap; Interfaces Collection, Map.*
Ed Ort et al, Java Architecture for XML Binding (JAXB), Mar. 2003, Sun Microsystems, http://java.sun.com/developer/technicalArticles/WebServices/jaxb.*
http://java.sun.com/j2se/1.3/docs/api/index.html, Java 2 Platform, Standard Edition, v. 1.3.1 API Specification, Sun Microsystems, Class Object.*

(Continued)

*Primary Examiner*—Pierre M Vital
*Assistant Examiner*—Jason Liao
(74) *Attorney, Agent, or Firm*—Workman Nydegger

(57) ABSTRACT

The subject disclosure pertains to a loop enumerator. The enumerator includes its own collection of items that can be generated manually or loaded from a file. Further, the items themselves can be collections of variable size. These collections of items can be customized to enable enumeration over non-uniform data and/or data that cannot otherwise be logically filtered easily.

17 Claims, 13 Drawing Sheets

OTHER PUBLICATIONS

JDK 1.3.1 "src.jar", Before Feb. 6, 2002, Sun Microsystems, 1.3.1, Set.java, HashSet.java, HashMap.java.*
Howe, FOLDOC, Jul. 7, 1999, http://foldoc.org/pointer.*
Howe, FOLDOC, Mar. 27, 2005, http://foldoc.org/workflow.*
Viji., Core Java—Tell me the differences between enumeration and iteration, varied, but including Dec. 14, 2005, Geek Interview, http://www.geekinterview.com/question_details/18490.*
http://java.sun.com/j2se/1.3/docs/api/index.html, Java 2 Platform Standard Edition v. 1.3.1 API Specification, Aug. 23, 2000 [Verified: http://web.archive.org/web/*/http://java.sun.com/j2se/1.3/docs/api/]Sun Microsystems, Classes Collections, Enumeration, HashMap; Interfaces Collection, Map.*
http://java.sun.com/j2se/1.3/docs/api/index.html, Java 2 Platform Standard Edition v. 1.3.1 API Specification, Aug. 23, 2000 [Verified: http://web.archive.org/web/*/http://java.sun.com/j2se/1.3/docs/api/], Sun Microsystems, Class Object.*
"How to: Configure a Foreach Loop Container," MSDN, © 2005 Microsoft Corporation, (3 pages).
"Foreach Loop Editor (Collection Page)," MSDN, © 2005 Microsoft Corporation, (8 pages).
Policht, M.; "SQL Server Integration Services," (7 pages), Sep. 9, 2005.
"For Each Enumerator Infos.Item Property," MSDN, © 2005 Microsoft Corporation, (3 pages).

* cited by examiner

FOR EACH ITEM ENUMERATOR FOR CUSTOM COLLECTIONS OF ITEMS

BACKGROUND

Workflow systems represent the application of technology to process management. A workflow is an organized set of interrelated tasks that define the operational aspect of a process or procedure. In particular, a workflow defines how tasks are structured, which entities are responsible and relative ordering of tasks, among other things. A workflow facilitates automated design, control and monitoring of processes.

One widely known workflow is the enterprise workflow. A workflow in this domain automates business processes such that documents, information or tasks are passed to individuals for action in accordance with procedural rules. For instance, a worker performs some designated work in a sequence. Subsequently, work by others can be initiated after the worker completes their task. In effect, delivery of work is automated and controlled based on completion of precedent tasks. By way of example, a loan evaluation or approval process could be represented as a workflow.

Workflow can also be associated with computer systems and functionality associate therewith, rather than solely human tasks. For example, workflows can be defined to facilitate data transformation services including processing, cleansing and storing data in a data warehouse, amongst other things.

A workflow management system facilitates creation or a workflow and management of workflow execution. First, a workflow or workflow diagram is created utilizing a process modeling notation or language. Such a notation is a conventionally a graphical representation of objects such as data flow, control and connection objects and relationships amongst objects. Through this language or notation, processes can be developed utilizing what is sometimes referred to as a workflow modeling component, build time system or design system.

In one conventional implementation, packages represent a unit of work that can be independently retrieved, executed and/or saved. Furthermore, the package serves as a container for all other elements broadly characterized as control flow or data flow.

Control flow elements dictate processing sequence in a package and can include one or more containers to define package structure, tasks that define package functionality or work and precedent constraints that link executables, containers and tasks and specify the order of execution of the linked objects. Control flow elements prepare or copy data, interact with other processes or implement repeating workflow.

One particular type of control flow element is the for-each loop container. The container specifies a workflow that is to be executed for each element of a collection of like elements. In other words, for each collection element do something. The collection elements are provided by an enumerator for a collection of a particular data type. As a result, there are a plurality of enumerators associated with particular collection types including a files, variables, row sets, server objects and XML nodes.

Data flow elements including source adapters, transformations and destination adapters, as the name suggests, define the flow of data in a package that extracts, transforms and loads data. Source adapters make data available to a data flow. Transformations perform modifications to data such as aggregation (average, sum), merging (of multiple input data sets), distribution (to different outputs) and data type conversion. Destination adapters load output of the data flow into target repositories such as flat files, databases or memory.

In addition to a design or build-time component, a workflow management system also includes an execution management component or run-time system. Such a system can include a workflow engine that coordinates performance of process or task steps defined by a workflow. Stated differently, the workflow engine enforces specified control flow and precedent constraints or manages execution of a workflow object model.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to a loop enumerator. The enumerator provides a mechanism to drive a loop with a custom enumerator collection. Further, the enumerator collection can include elements that are themselves collections of values of variable size. These values can identify items as well as specify setting associated, therewith thereby supporting conditional workflow, among other things. Hence, the subject enumerator can be employed in situations where a set of items needs to be processed repetitively in the same manner and such items conventionally cannot be grouped or are not easily grouped for enumeration.

In accordance with an aspect of the subject innovation, the enumerator can include a collection management component that facilitates generating and otherwise manipulating a collection associated with an enumerator. For example, data can be entered manually and/or loaded from a file. Once, generated the management component can also enable the collection to be exported to a file.

According to another aspect of the innovation, the enumerator includes an iterator component that maintains an index and provides collection items iteratively in response to loop requests. In one instance, the collection values can be saved to one or more variables and accessed there from by loop tasks.

In accordance with yet another aspect of the invention, an interface is provided to enable generation of enumeration collections. For example, the interface can be a graphical user interface that facilitates collection definition and variable mappings.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
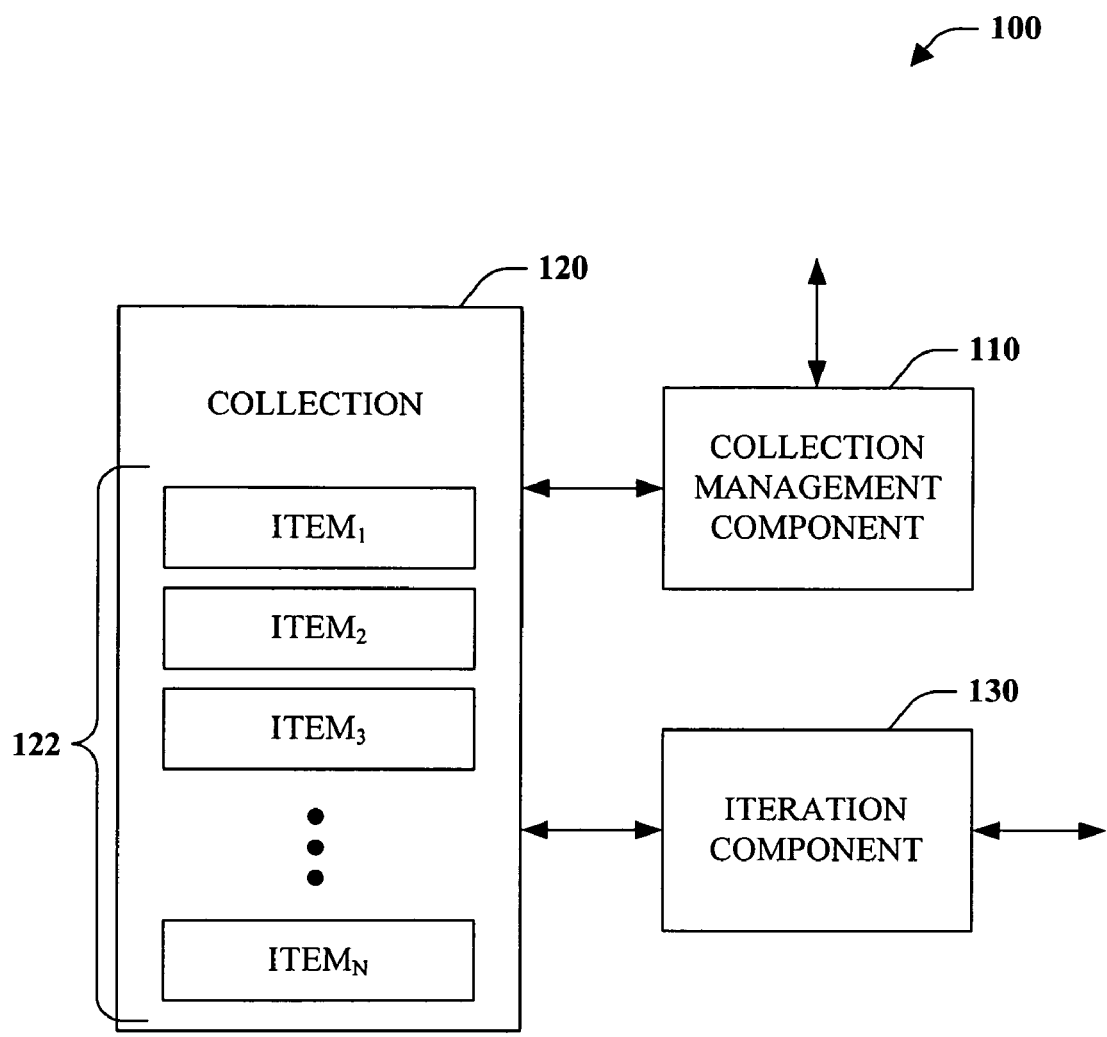
FIG. 1 is a block diagram of an enumerator component of a workflow system.

Referring initially to FIG. 1, an enumerator 100 of a workflow system is illustrated in accordance with an aspect of the subject innovation. The enumerator 100 (a component as defined herein) includes a collection management component 110. As will be described in more detail infra, the collection management component 110 can enable generation and interaction with a collection 120. Unlike conventional enumerators that rely on external data sources, enumerator 100 can include internal or associated enumerator collection 120, which is beneficial at least in decreasing external dependencies. Collection 120 is a custom set of values identifying items 122 ($ITEM_1$-$ITEM_N$, where N is an integer greater than or equal to one). In one instance, the collection 120 can include items 122 that would not conventionally be grouped in a collection. Generation and modification of the collection 120 can be facilitated via the collection management component 110.

The enumerator 100 also includes an iteration component 130. The iteration component 130 can respond to requests for collection elements or items 122 from loop components or packages such as a for-each loop. The iteration component 130 can maintain an index into the collection 120 and provide single items 122 iteratively by providing an initially indexed item followed by subsequent items until all items have been enumerated.

Figure 2:
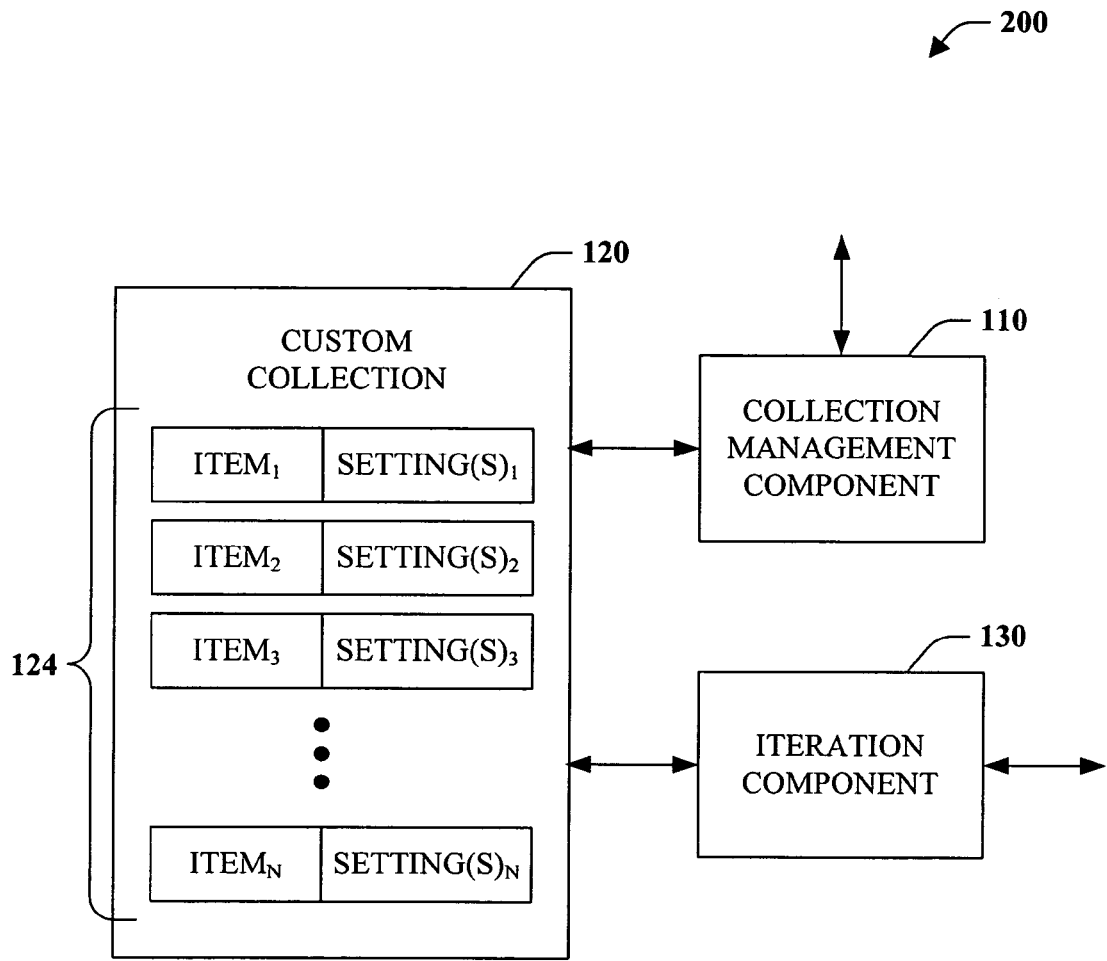
FIG. 2 is a block diagram of a matrix enumerator component of a workflow system.

FIG. 2 illustrates an enumerator 200 in accordance with an aspect of the subject innovation. Enumerator 200 similar to enumerator 100 of FIG. 1 includes collection management component 110, collection 120 and iteration component 130. Collection management component 110 manages the collection 120, and iteration component 130 provides values iteratively to requesting components such as loops. In contrast to enumerator 100, enumerator 200 includes a collection of items 124 that are themselves collections. Accordingly, enumerator 200 can be called a matrix or multi-valued enumerator. The items 124 can include a set of values or settings. For example, the values can identify an item such as but not limited to a database or file and metadata or settings associated with that item. Upon request for a collection element, rather than returning a single value identifying an item, numerous values are returned. This enables execution of complex conditional workflow based on settings that may not otherwise be possible. Furthermore, it should be noted that the number of values present in an item collection could vary. This provides flexibility. In such a case, upon a request for a collection element the iteration component 130 can supply a previous value if there is no current value, until there is a change.

Figure 3:
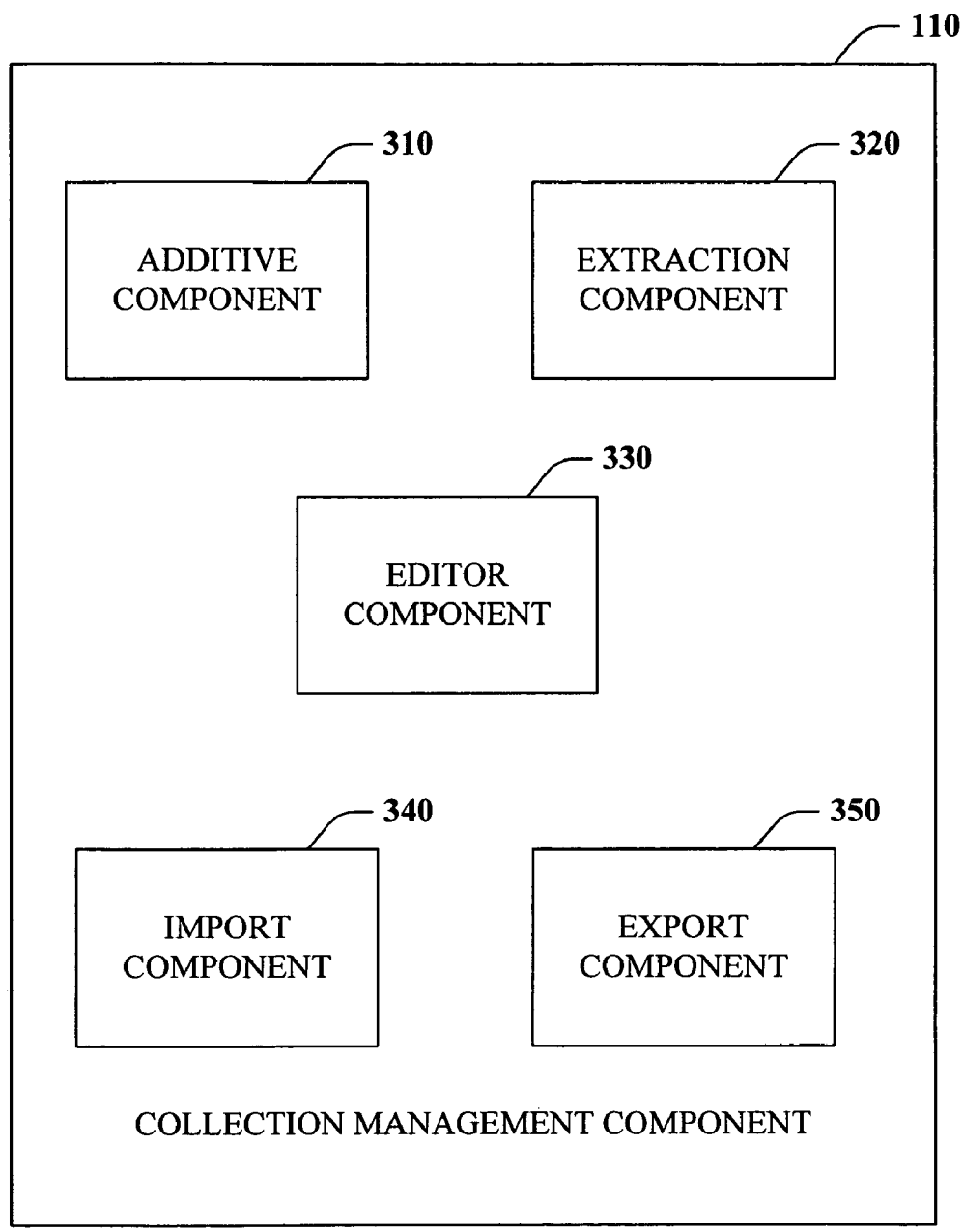
FIG. 3 is a block diagram of a collection management component.

Turning attention to FIG. 3, a collection management component 110 is illustrated in accordance with an aspect of the subject innovation. Collection management component 110 facilitates interaction with an enumerator collection and can include numerous components to enable such functionality. As illustrated, management component 110 can include additive component 310, extraction component 320, editor component 330, import component 340 and export component 350.

The additive, extraction and editor components 310, 320 and 330, respectively, provide functionality relating to collection items and settings. The additive component is operable to add one or more values to a collection. The extraction component 320 can remove one or more values from a collection, and the editor component 330 facilitates modifying or altering collection values. These components can be employed to aid building and/or modification of a custom enumerator collection.

The import and export components 340 and 350 operate with respect to entire collections of values. In particular, the import component 340 can retrieve an entire collection from a file and the export component 350 persist a collection to a file. For instance, a collection can be imported from or exported to an XML (eXtensible Markup Language) file. An exemplary format for the file follows:

```
<FEIEItems>
    <FEIEItem>
        <FEIEItemValue Type="3" Value="11"/>
        <FEIEItemValue Type="3" Value="12"/>
    </FEIEItem>
    <FEIEItem>
        <FEIEItemValue Type="3" Value="21"/>
        <FEIEItemValue Type="3" Value="22"/>
    </FEIEItem>
</FEIEItems>
```

FEIE denotes a for-each item enumerator. The Type attribute specifies the type of the Value attribute for this ItemValue. The Value attribute specifies the actual value of the ItemValue.

Figure 4:
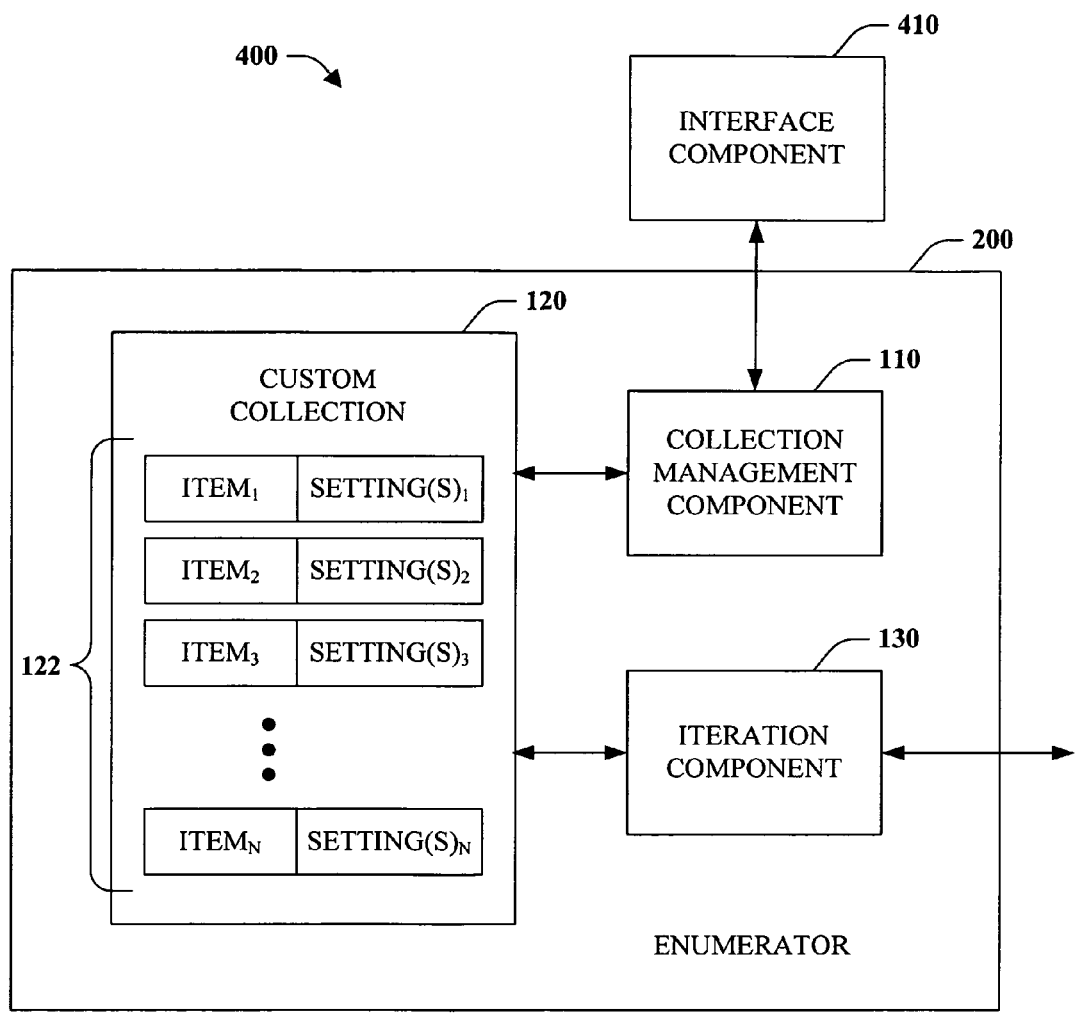
FIG. 4 is a block diagram of a enumeration system.

FIG. 4 depicts an enumeration system 400 in accordance with an aspect of the subject innovation. Enumeration system 400 includes the enumerator 200 of FIG. 2 and an interface component 410. As previously described, the enumerator 200 includes a management component 110 that manages the enumerator collection 120. The collection 120 includes one or more items that can include collections themselves. The enumerator 200 also includes an iterator component 130 that enumerates the collection in response to requests for collection elements. The interface component 410 is communicatively coupled to the collection management component 110 and enables individuals or entities to interact with the management component 110 and collection 120. For example, the interface component 410 can correspond to a graphical user interface that supplies and receives input to and from users. Individuals can employ the interface component 410 to build custom collections that may not otherwise be available or be capable of being built, for instance. To enable such cross communication, the collection management component 110 can implement functions, methods and the like that are able to be called by the interface component 410. Similarly, the interface component 410 can implement functions, method and the like that are executable by the collection management component 110. For example, the interface component 410 may call upon the functionality provided by the additive component 310 (FIG. 3) to add an item or a myriad of values to the collection.

Figure 5:
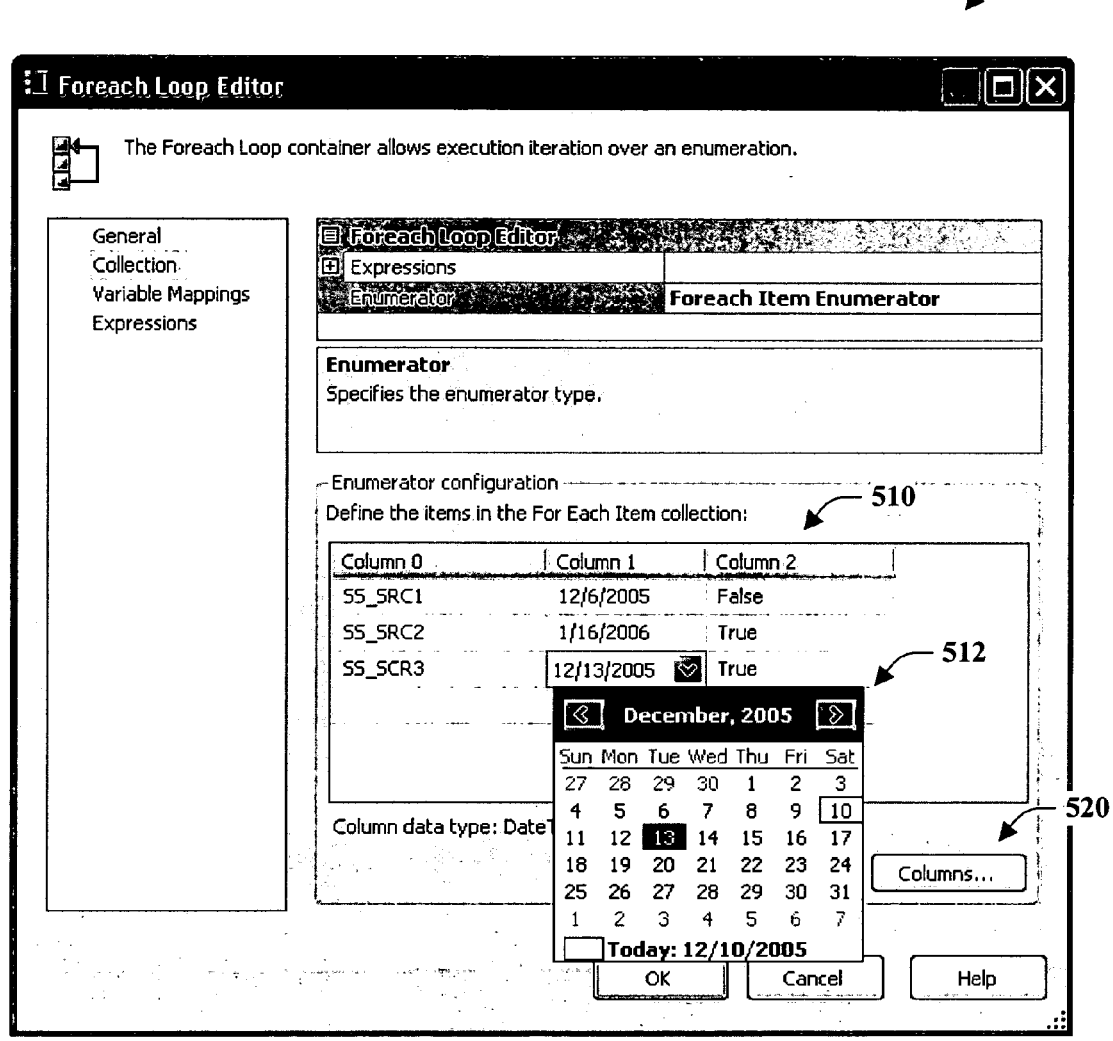
FIG. 5 is a screenshot of an exemplary graphical user interface.
Figure 6:
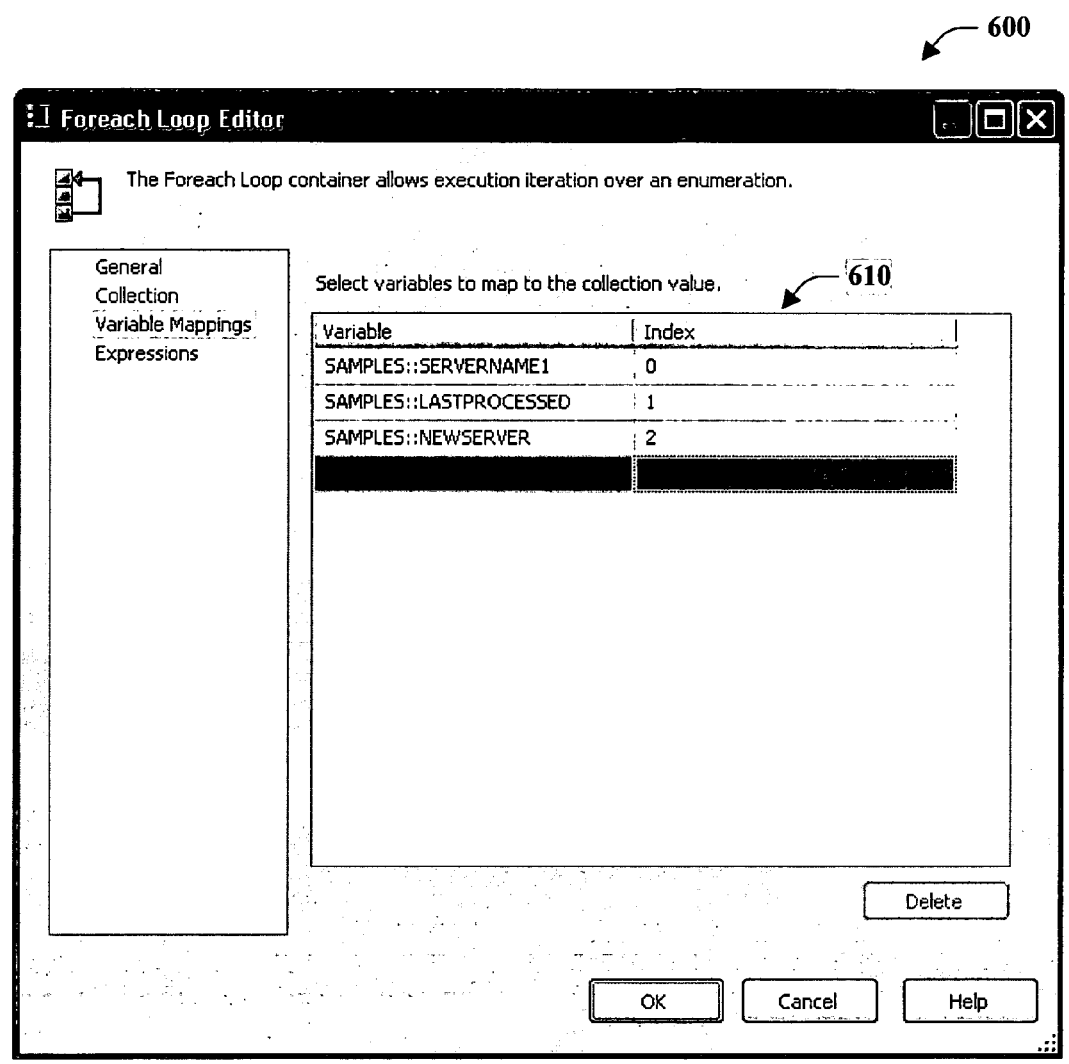
FIG. 6 is a screenshot of an exemplary graphical user interface.

FIGS. 5 and 6 provide exemplary screenshots 500 and 600 of graphical user interfaces that may be employed by an individual to interact with an enumerator and its collection. It should be appreciated that these screenshots illustrate only one way in which an interface can be set up for purposes of clarity and understanding of aspects of the innovatoin. Those of skill in the art will appreciate that user interfaces can take a variety of forms including a plurality of text, sound, video and/or graphics to facilitate providing and retrieving data. Accordingly, while the subject innovation can be practiced utilizing the interfaces illustrated by the screenshots, the invention is not limited thereto.

The enumerator of the subject innovation can be a matrix enumerator that enumerates over a collection of values or settings that can be created and entered with an interface or enumerator designer. In particular, the designer can provide a mechanism to create a custom collection that can drive a loop. In one implementation, a user can specify columns and column types and then enter data into the columns. The interface can modify the entry grid to match the columns created and check types of the values as they are entered.

Turning to FIG. 5, interface screenshot 500 is provided in accordance with an aspect of the innovation. The screenshot 500 illustrates an interface for a matrix enumerator with some data already entered. The grid and entered data are shown at 510. Depending on the type of the column, a type editor 512 can be displayed. Here, column one is a date/time column and as a result has a date type editor 512. Buttons 520 (one hidden behind type editor) are employed to remove rows and add and remove columns with respect to the grid 512.

Screenshot 500 shows a hypothetical collection one might create if they needed to perform maintenance work on databases every seventh day from the first date in Column one. Column two is a Boolean value that specifies if one wishes to send email when the loop processes the conditional work.

FIG. 6 illustrates an interface screenshot 600 that shows the variable mappings 610 for a sample loop with a mapping for each column in the enumerator. The variable mapping 610 thus is different from a non-matrix enumerator such as a conventional file enumerator. Note that here three variables are defined and that the value from the three columns is mapped to each of them. This one-to-one mapping is typical, but not enforced. One can create multiple mappings per column, which can be useful in some rare cases. These variables can be used within a loop to control its behavior. This can be called a variable driven loop. For example, a package references the "Send Mail" variable in a precedence constraint to determine if the "Send Mail" task should execute. The precedence constraint between the first task and the "Conditional Work" task also uses the "Process Date" variable to execute a task on certain dates, rather than all days.

Notice that the variables have been defined at the loop scope. It is a good practice to define variables at the scope where they are used. In this case, the variables are defined at the for-each loop's scope. If one defined the variables at a more global scope, for instance the package scope, then tasks outside the loop can modify the variables and alter the behavior of the loop possibly causing the loop to have timing related bugs.

Figure 7:
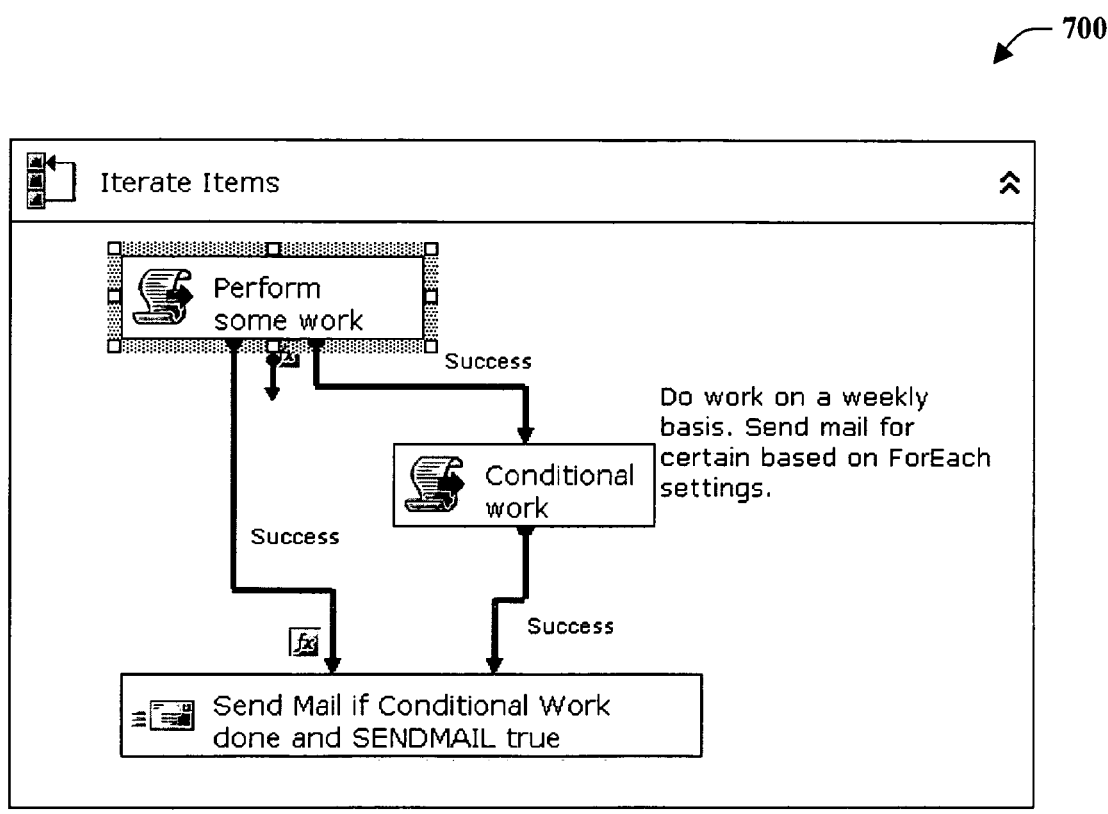
FIG. 7 illustrates a workflow for a sample package.

FIG. 7 illustrates an exemplary package workflow 700 that can be executed utilizing the subject enumerator with the collection defined in FIGS. 5 and 6. The enumerator of the subject innovation provides a mechanism, amongst other things, to enumerate a collection when there is no default way to generate a collection and to simplify enumerating over custom collections. The enumerator is not appropriate for every problem, but it can come in handy when there are a few manual settings that one desires to include in a collection without establishing a more formal conventional collection. As illustrated, the sample workflow package 700 corresponds to a for-each loop designed to do some work for each server specified by an enumerator. The enumerator can be modified to reflect the work desired to be done in an environment, or the package can be run unchanged and it will execute the sample workflow automatically. The subject matrix enumerator can be employed to drive behavior of some very complex loops, for instance as shown by package 700. Here, the sample package 700 simulates a package that: (1) Performs some work on every database name in column zero; (2) Performs conditional work on every seventh day after the date in column one, if the previous task was successful; and (3) Sends email conditionally based on the success of the first two tasks and if the value in column two is true.

Figure 8:
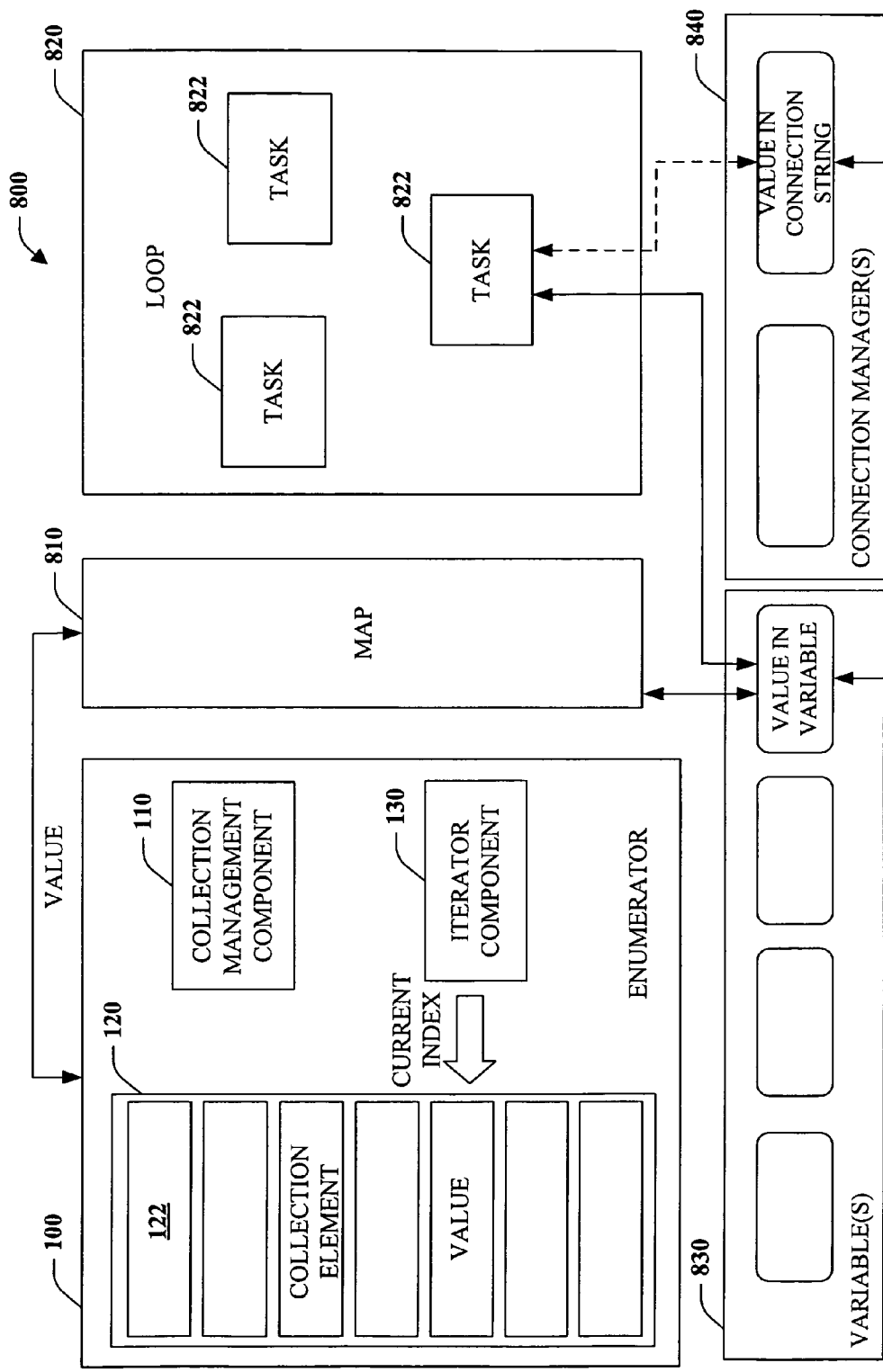
FIG. 8 is a block diagram of an exemplary workflow loop system.

FIG. 8 illustrates an exemplary workflow loop system 800 to illustrate how tasks can use values in collections in accordance with an aspect of the innovation. System 800 includes enumerator 100, map component 810, loop container 820, variable(s) 830 and connection manager(s) 840. The enumerator 100, as previously described, can include a collection management component 110, a collection 120 of items 122 and an iterator component 130. The enumerator 100 can provide one item or value per iteration from collection 120 upon request from the loop container 820. The map component 810 can receive, retrieve or otherwise obtain or acquire a value from the enumerator 100. Subsequent or concurrently, the value can be saved to a variable 830. A task 822 from a loop container 820 can access the value from the variable 830. The connection manager(s) 840 provides a mechanism for connecting to a particular data source such as a relational database. The connection manager(s) 840 can also access the current enumerated value from the variable(s) 830 to facilitate connection to a source. The dashed line indicates that in some instances the task 822 can access the value of the current enumerated value indirectly through communications with the connection manager(s) 840.

Figure 9:
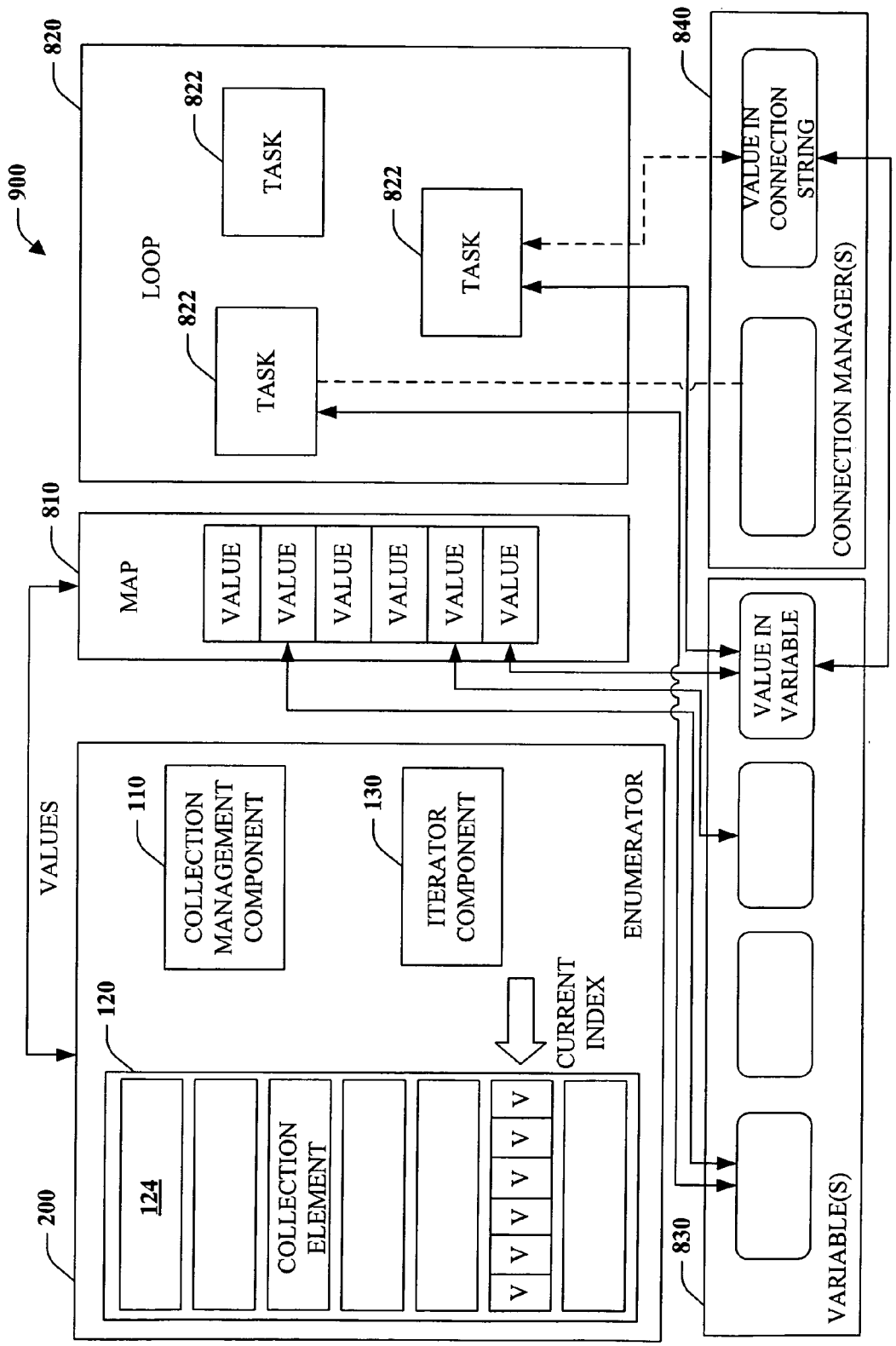
FIG. 9 is a block diagram of an exemplary workflow loop system.

FIG. 9 provides an exemplary workflow loop system 900 in accordance with an aspect of the subject innovation. System 900 is similar to system 800 of FIG. 8 except that system 900 depicts a scenario where the enumerator is a matrix or multi-valued enumerator. Accordingly, system 900 includes matrix enumerator 200, map component 810, loop container 820, variable(s) 830 and connection manager(s) 840. As described supra, enumerator 200 includes a collection management component 110, collection 120 of a collection of items or values 124 and an iterator component 130. The collection management component 110 facilitates generation of collection 120. The iterator component 120 keeps track of current collection element via an index and provides or makes element values accessible to map component 810 upon request by the loop container 820. The map component 820 receives, retrieves or otherwise acquires element values and saves them to variables 830. The loop container tasks 822 can access appropriate values from the variables 830. The connection managers 840 provide a mechanism for accessing data from various sources such as databases, files and the like. The connection managers 840 can also retrieve or access values from the appropriate variables 830 and set up connections. In some instances, the tasks 822 can retrieve values indirectly though connection managers 840. This is represented using dashed lines in the figure. Further, it should be noted that the collection of values can have variable size. When an index in a collection is not found, the variable mapping can preserve its value from a previous iteration of the loop.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the interface component 410 can employs such mechanisms to provide intelligent assistance when designing an enumerator. For instance, the interface component can learn user preferences and suggest or infer actions.

Figure 10:
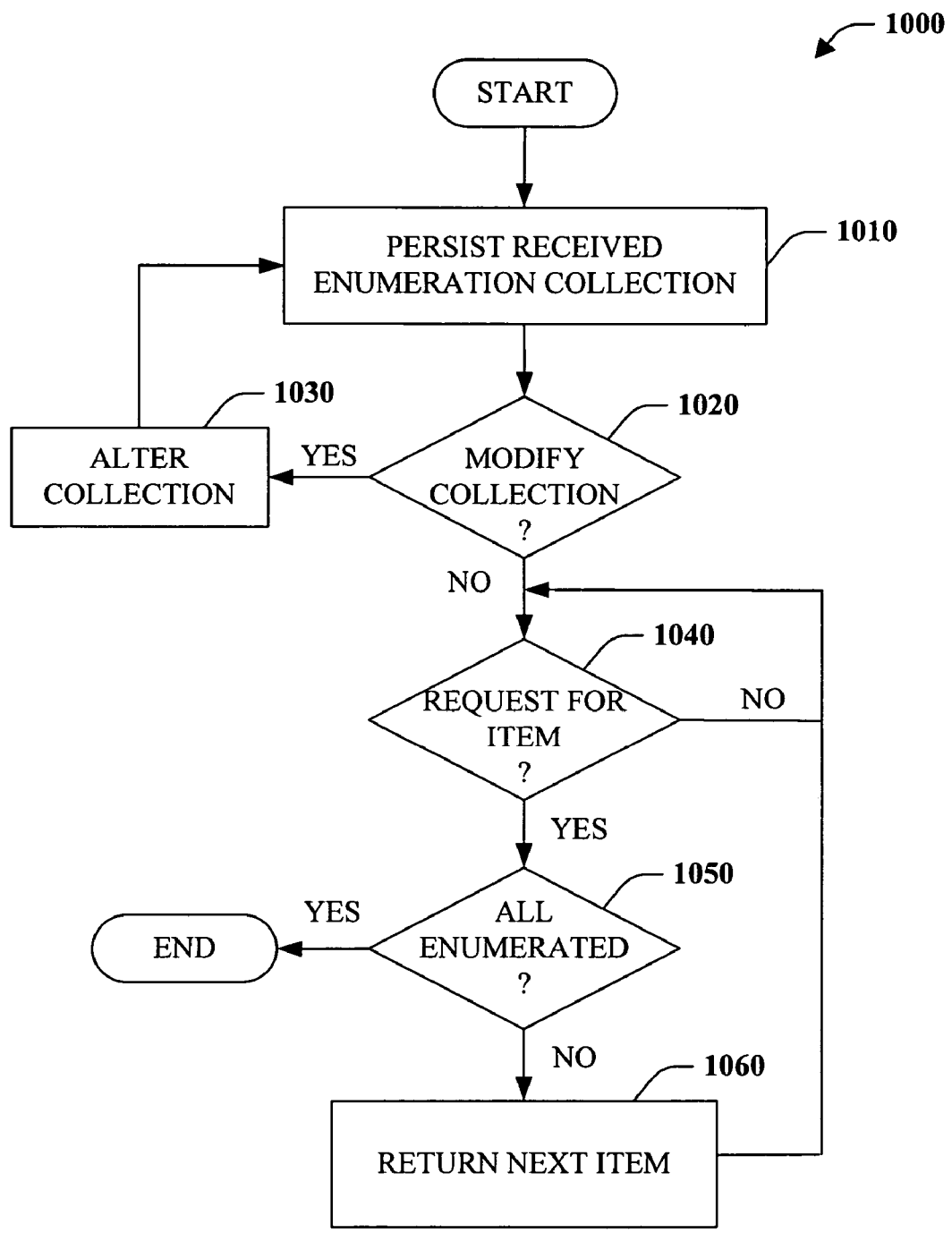
FIG. 10 is a flow chart diagram of an enumeration method.
Figure 11:
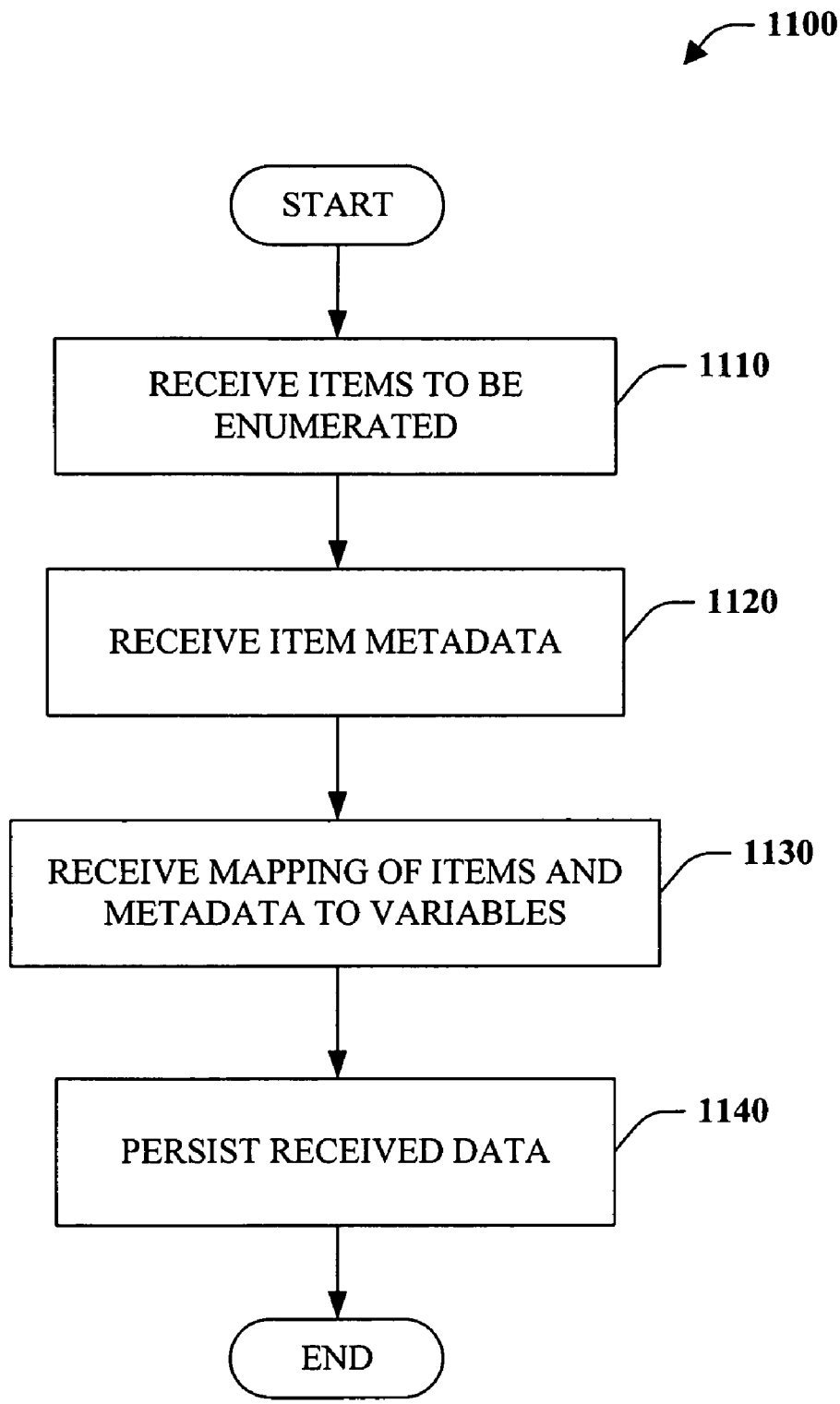
FIG. 11 is a flow chart diagram of a method of building an enumeration collection.

In view of the exemplary systems described supra, methodologies that may be implemented in accordance with the disclosed subject matter will be better appreciated with reference to the flow charts of FIGS. 10 and 11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier or media.

Turning attention to FIG. 10, an enumeration method 1000 is illustrated in accordance with an aspect of the subject innovation. At reference numeral 1010, a received enumeration collection is persisted. The enumeration collection can be a custom collection that can be employed in situations in which there exists a fairly fixed list of non-uniform inputs that one desires to enumerate repetitively over time. For example, if one needs to process the same files, FTP data from the same locations or perform maintenance tasks on the same servers, a custom collection can be built to hold those values. The enumeration collection can be persisted from manual input or from a file, among other things. At reference numeral 1020, a determination is made as to whether one desires to modify the collection. If yes, the collection is altered as specified at 1030. For example, a user can employ a graphical user interface to make changes to the collection. At numeral 1040, a check is made as to whether a request for an item has been received from a loop. If no, the method continues to cycle and check whether a request for an item is received. If yes, the method proceeds to numeral 1050 where a determination is made as to whether all items have been enumerated. If yes, the method terminates. If all items have not been enumerated, then at 1060 the next item in the collection is returned. It should be appreciated that this can be a single value or a collection of values of the same or variable length. Subsequently, the method continues at 1040 where the method checks if a request for an item has been received.

FIG. 11 is a flow chart diagram of a method 1100 of generating an enumerator collection in accordance with an aspect of the subject innovation. As previously mentioned the enumerator collection can be a custom collection that may not otherwise be available to drive a loop, such as a for-each loop. At reference numeral 1110, one or more items to be enumerated are received. At numeral 1120, metadata associated with the items are received. The metadata can provide custom settings with respect to items to enable conditional looping. The items and metadata are mapped to variables at 1130. This enables loop tasks as well as connection managers to access and employ such information. At reference numeral 1140, the received items and metadata are persisted.

Figure 12:
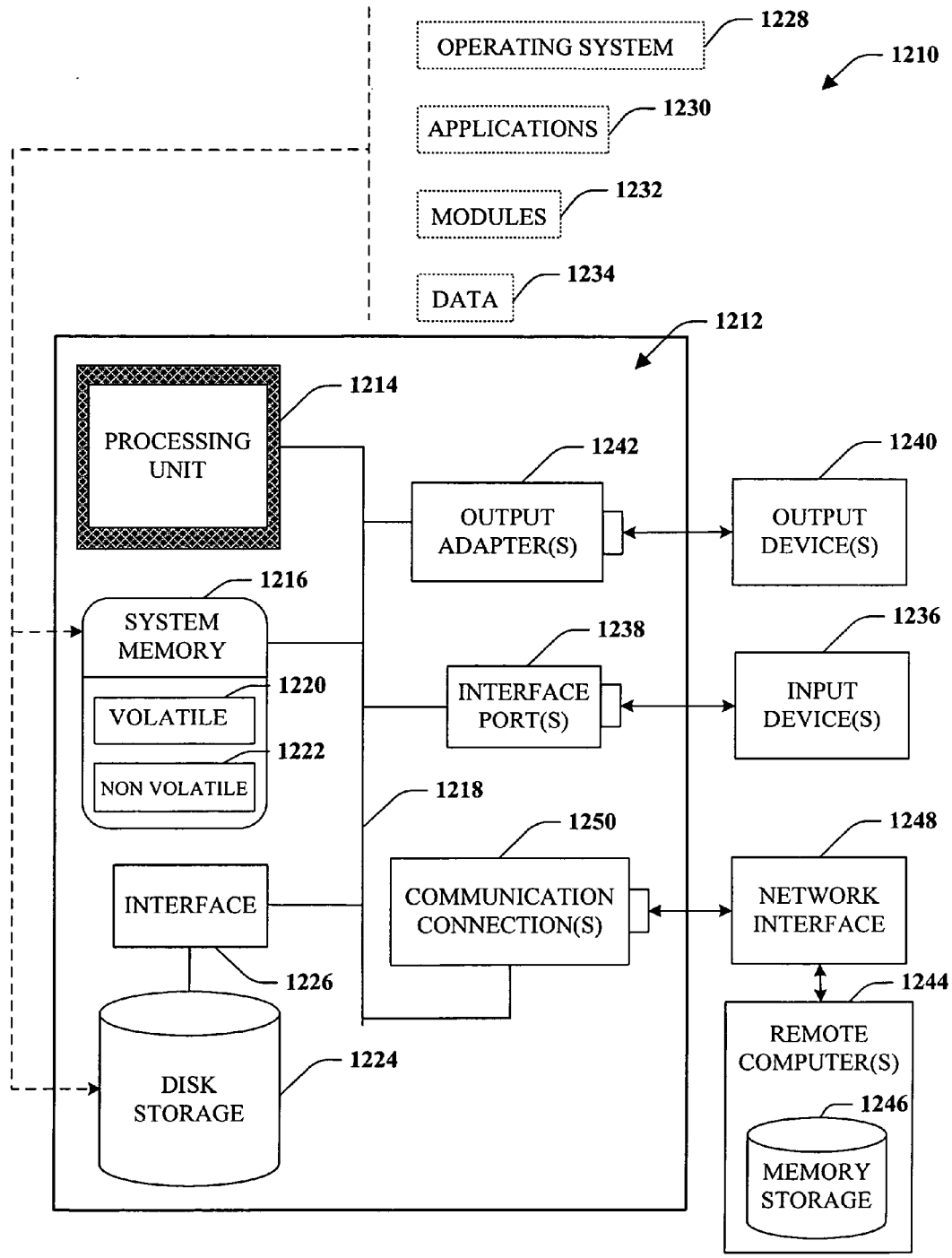
FIG. 12 is a schematic block diagram illustrating a suitable operating environment for aspects of the subject innovation.
Figure 13:
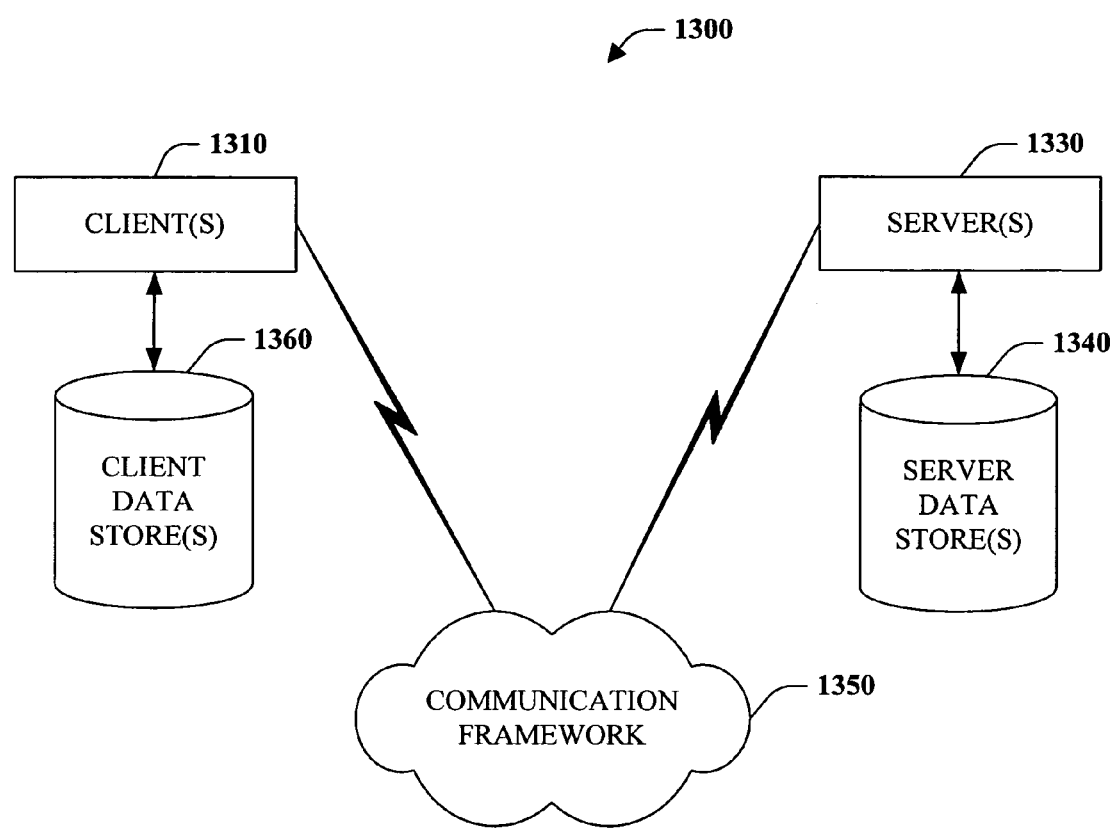
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1216, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer readable storage medium including a workflow system implementing an enumerator comprising the following enumeration components:
    a collection management component that manages a custom collection of items stored internal to the enumerator, wherein at least two items within the collection are of different data types from each other, wherein at least one or more of the items are themselves collection of values, wherein at least one item is to be enumerated, and wherein the at least one or more of the items that are themselves collections of values are created and entered using an enumerator designer creating the custom collection that can drive a loop, creating the custom collection comprising specifying a plurality of columns and column types and entering different values for items into the different columns, wherein at least one column specifies an item on which work is always performed, and at least one column specifies an item on which work is conditionally performed when a predetermined condition is met; and
    an iterator component that iterates through the custom collection of items and provides items in the custom collection of items in response to requests for collection items from a package workflow, wherein when the iterator provides an item in the collection of items that is itself a collection of values, then the iterator provides a response with numerous values based on the values in the collection, and wherein the package workflow executes a same workflow for each item in the custom collection as specified in a graphical representation of the workflow, and wherein when the workflow executes on an item in the collection of items that is itself a collection of values items, then the workflow performing work on the item on which work is always performed and determining that the predetermined condition is met and as a result of performing work on the item on which work is conditionally performed.

2. The computer readable storage medium of claim 1, the values are mapped to variables.

3. The computer readable storage medium of claim 1, the management component includes an additive component to add items to the collection.

4. The computer readable storage medium of claim 1, the management component includes an extraction component that removes an item from the collection.

5. The computer readable storage medium of claim 1, the management component includes an import component retrieves the collection from a file.

6. The computer readable storage medium of claim 1, the management component includes an export component that saves the collection to a file.

7. The computer readable storage medium of claim 1, the iterator component supplies collection items to a workflow loop container upon request until all items have been provided.

8. The computer readable storage medium of claim 1, the iterator component supplies the items to a map component that saves the items to variables accessible by container tasks.

9. The computer readable storage medium of claim 1, the collection management component receives the collection from a graphical user interface that enables a user to manually specify the collection.

10. An enumeration method comprising the following computer-implemented acts:
    a computer system persisting a custom collection of items internal to an enumerator, wherein:

at least two items within the collection are of different data types from each other;

at least one item in the collection of items internal to the enumerator is itself a collection which comprises a first number of items, and wherein the at least one item in the collection of items internal to the enumerator is itself a collection and is created and entered using an enumerator designer creating the custom collection that can drive a loop, creating the custom collection comprising specifying a plurality of columns and column types and entering different values for items into the different columns, wherein at least one column specifies an item on which work is always performed, and at least one column specifies an item on which work is conditionally performed when a predetermined condition is met;

at least one other item in the collection of items internal to the enumerator is itself a collection which comprises a second number of items;

wherein the first and second numbers are different numbers from each other, the items are collections of values, wherein at least one item includes metadata, the metadata specifying a condition upon which the at least one item is to be enumerated;

the enumerator providing the collection of items iteratively upon request from a loop container until all items have been provided, including when an item is a collection itself, providing a response with numerous values based on all of the items in the item which is a collection; and at the loop container executing a same workflow for each item in the collection as specified in a graphical representation of the workflow, and wherein when the workflow executes on an item in the collection of items that is itself a collection of values items, then the workflow performing work on the item on which work is always performed and determining that the predetermined condition is met and as a result performing work on the item on which work is conditionally performed.

11. The method of claim 10, further comprising receiving the custom collection of items.

12. The method of claim 11, receiving the custom collection of items comprises receiving items that are collections.

13. The method of claim 12, receiving the custom collection of items from an enumerator designer graphical user interface.

14. The method of claim 12, receiving the custom collection of items from an XML file.

15. The method of claim 10, further comprising importing the custom collection of items from an XML file.

16. The method of claim 10, further comprising exporting the custom collection of items to an XML file.

17. The method of claim 10, providing the items to a mapping component that saves item values to variables accessible by loop container tasks.

* * * * *